No. 735,812. PATENTED AUG. 11, 1903.
E. H. PHIPPS.
VEHICLE WHEEL.
APPLICATION FILED APR. 18, 1902. RENEWED JAN. 14, 1903.
NO MODEL.
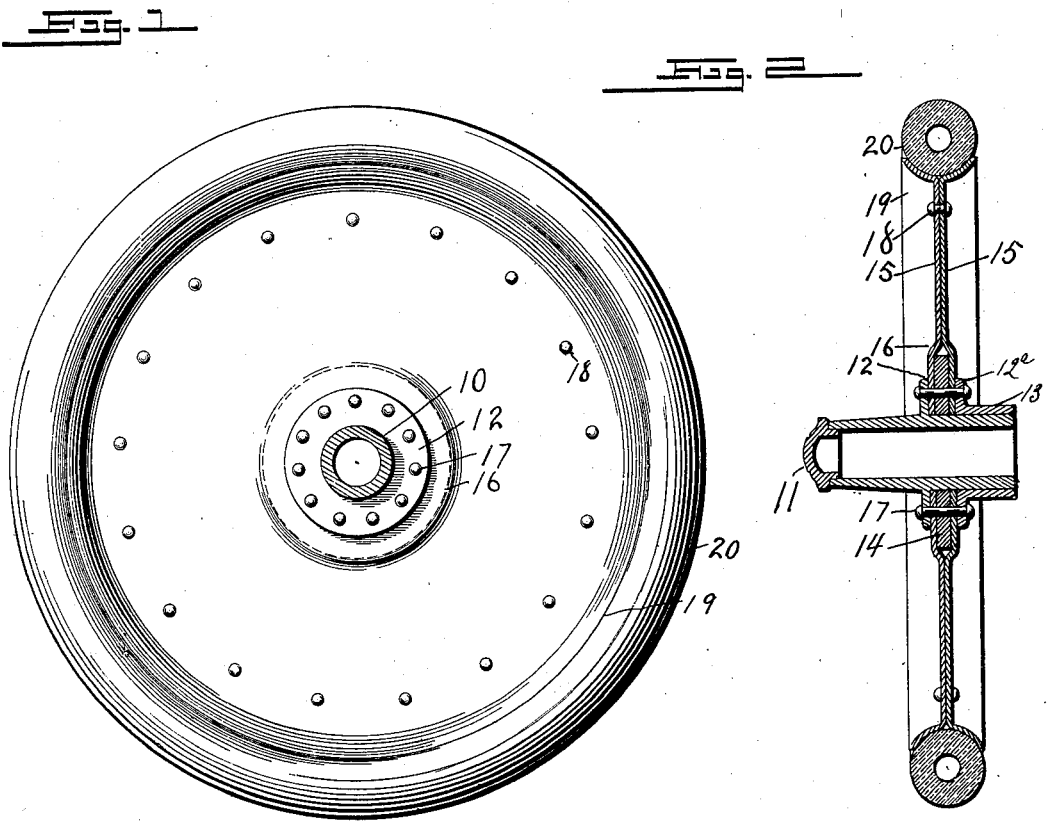
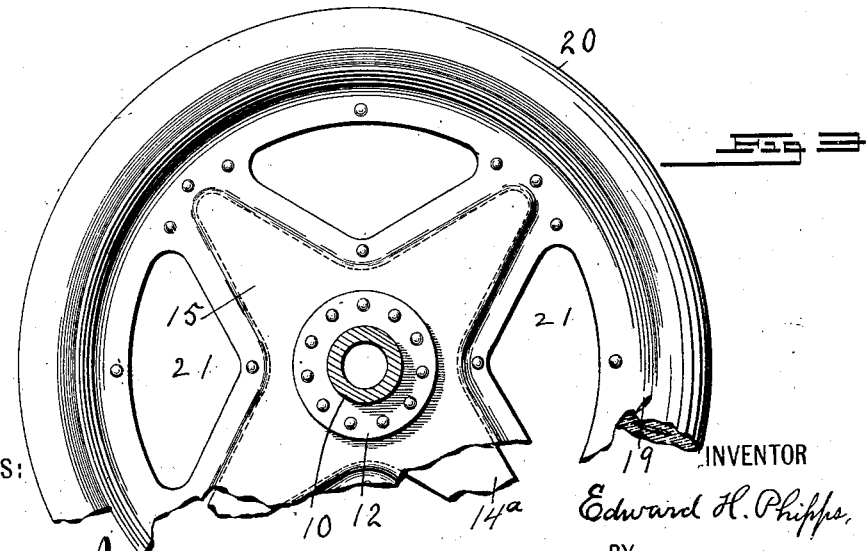
WITNESSES:
Wm C Caufield Jr
J. G. Dunbar
INVENTOR
Edward H. Phipps,
BY
W. B. Hutchinson.
ATTORNEY.

No. 735,812. Patented August 11, 1903.

UNITED STATES PATENT OFFICE.

EDWARD H. PHIPPS, OF NEW YORK, N. Y., ASSIGNOR TO PHIPPS ROAD CAR COMPANY, A CORPORATION OF NEW JERSEY.

VEHICLE-WHEEL.

SPECIFICATION forming part of Letters Patent No. 735,812, dated August 11, 1903.

Application filed April 18, 1902. Renewed January 14, 1903. Serial No. 139,078. (No model.)

*To all whom it may concern:*

Be it known that I, EDWARD H. PHIPPS, of the city, county, and State of New York, have invented certain new and useful Improvements in Vehicle-Wheels, of which the following is a full, clear, and exact description.

My invention relates to improvements in vehicle-wheels, and while my invention is especially intended for use in connection with motor-vehicles it is also applicable to any ordinary vehicle.

The object of my invention is to produce a cheap and simple metallic wheel which can be practically stamped out to the end that it may be made cheaply and of accurate proportions and also to construct the wheel in such a way that it will be very light and particularly strong in proportion to its weight.

To these ends my invention consists of a wheel the construction of which will be hereinafter specifically described and claimed.

Reference is to be had to the accompanying drawings, forming part of this specification, in which similar figures of reference refer to similar parts throughout the several views.

Figure 1 is a sectional elevation of the wheel embodied in my invention. Fig. 2 is a vertical cross-section of the same, and Fig. 3 is a broken sectional elevation of a slightly-modified form of the wheel.

The wheel can be made of any suitable metal, but is preferably made from steel. It has a hub 10, which, as shown, is hollow, as usual, but which can be made in any desired shape to suit any required style of vehicle or axle, and, as shown, the outer end of the hub is provided with the customary nut 11. Around the central part of the hub are the parallel flanges 12 and 12$^a$, the former being integral with the hub and the latter being made on the sleeve 13, this form being for convenience in putting the parts of the wheel together, as will presently appear. The sleeve 13 fits snugly to the hub, and in the finished wheel the two flanges 12 and 12$^a$ are united.

Between the flanges 12 and 12$^a$ is an annulus or ring 14, which is preferably flat and which is used to stiffen the body portion of the wheel. This latter is made up of opposed and similar plates 15, of sheet metal, preferably steel, which near the hub are expanded slightly, as shown at 16, so that they will fit on over the annulus 14, and after being fitted in this way the two flanges 12 and 12$^a$, the two expanded parts 16 of the wheel, and the annulus 14 are all firmly riveted or otherwise fastened together, the drawings showing rivets 17 for the purpose. At points between the hub and the periphery of the wheel the two parts 15 are also firmly united by rivets 18 or other fastenings.

The wheel is provided with a felly 19, which is formed half on one part 15 and half on the opposed part, and it will be readily seen that the parts 15 can be very easily stamped, so as to form the body part 15, the felly 19, and the expanded part 16.

It will be seen, too, that when the wheel is put together as described it is exceedingly rigid and that by reason of the form of fastening thin metal can be used in its manufacture and still make a very strong wheel.

I have shown the common form of tire 20, secured to the felly 19 as usual.

To improve the appearance of the wheel, the body part can be cut away in portions, as shown at 21 in Fig. 3, and this or the form shown in Fig. 1 (a spider 14$^a$) can be substituted for the annulus 14.

In carrying out my invention I prefer to have the parts 15 abut with each other throughout the greater portion of their surfaces, as the wheel is thereby made stronger; but I do not limit myself to this precise construction.

Having now fully described my invention, what I claim as new, and desire to secure by Letters Patent, is—

1. As an improved article of manufacture, a vehicle-wheel comprising a hub having a circumferential flange, a sleeve on said hub also having a circumferential flange, a body formed of two flat metallic sheets lying together, each sheet consisting of a disk perforated at its center, having its outer periphery flanged to form part of a felly, and having an offset at its inner periphery, said two offsets being adapted to inclose a strengthening-ring, and means for fastening said flanges, disks and straightening-ring together.

2. As an improved article of manufacture, a vehicle-wheel comprising a hub having a circumferential flange, a sleeve on said hub having a circumferential flange, a body made of flat metallic sheets lying together forming on their outer edges a felly and embracing on their inner peripheries a strengthening-ring, said flanges, the ring and the sheets being fastened together.

3. As an improved article of manufacture, a vehicle-wheel comprising a hub having a circumferential flange, a sleeve on said hub having a circumferential flange, a body formed of metallic sheets, a strengthening-rib with radially-arranged arms located between the sheets and fastened thereto, the said body portion lying between the flanges and being secured thereto.

In testimony whereof I have signed my name to this specification in the presence of two subscribing witnesses.

EDWARD H. PHIPPS.

In presence of—
WARREN B. HUTCHINSON,
THERON DAVIS.